(12) United States Patent
Aiba (10) Patent No.: US 11,666,987 B2
(45) Date of Patent: Jun. 6, 2023

(54) LASER POWER CONTROL DEVICE, LASER MACHINING DEVICE, AND LASER POWER CONTROL METHOD

(71) Applicant: SUMITOMO HEAVY INDUSTRIES, LTD., Tokyo (JP)

(72) Inventor: Takeshi Aiba, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 73 days.

(21) Appl. No.: 17/017,103

(22) Filed: Sep. 10, 2020

(65) Prior Publication Data

US 2020/0406395 A1  Dec. 31, 2020

Related U.S. Application Data

(63) Continuation of application No. PCT/JP2019/009232, filed on Mar. 8, 2019.

(30) Foreign Application Priority Data

Mar. 13, 2018 (JP) .............................. JP2018-044860

(51) Int. Cl.
  *B23K 26/06* (2014.01)
  *B23K 26/064* (2014.01)
  *B23K 26/03* (2006.01)

(52) U.S. Cl.
  CPC ........ *B23K 26/0626* (2013.01); *B23K 26/034* (2013.01); *B23K 26/064* (2015.10)

(58) Field of Classification Search
  CPC ................. B22F 10/30; B22F 2999/00; B22F 2203/03; B22F 10/20; B22F 12/00; B23K 26/032; B23K 26/342; B23K 31/125; B23K 15/0013; B23K 2101/18; B23K 2103/04; B23K 2103/14; B23K 2103/26;
(Continued)

(56) References Cited

U.S. PATENT DOCUMENTS 5,162,239 A * 11/1992 Winer ................... H01L 33/18
                                           438/22
6,615,099 B1 * 9/2003 Muller .................. B23K 26/04
                                           219/121.68
(Continued)

FOREIGN PATENT DOCUMENTS

JP    H03-056615 A    3/1991
JP    2007-059458 A   3/2007
(Continued)

OTHER PUBLICATIONS

JP 2013239572 A (Year: 2013).*
Supplementary Search Report issued in European Application No. 19767064.9, dated Apr. 20, 2021.
International Search Report issued in Application No. PCT/JP2019/009232, dated May 14, 2019.

*Primary Examiner* — Tu B Hoang
*Assistant Examiner* — Vy T Nguyen
(74) *Attorney, Agent, or Firm* — Michael Best & Friedrich LLP (57) ABSTRACT

A laser power control device includes a storage unit that stores relational data having a measurement value of a heat radiation sensor, which measures intensity of heat radiation of an irradiation object irradiated with a laser beam from a laser machining device in association with a power value of the laser beam on a machining surface of the laser machining device.

4 Claims, 4 Drawing Sheets

(58) Field of Classification Search
CPC ............ B23K 2103/50; B23K 2103/52; B23K 26/03; B23K 26/034; B23K 26/0342; B23K 26/0665; B23K 26/083; B23K 26/0861; B23K 26/144; B23K 26/26; B23K 26/32; B23K 9/044; B23K 9/0953; B29C 64/153; B29C 64/393; B29C 64/268; B33Y 10/00; B33Y 30/00; B33Y 50/02; G01B 9/02091; G01B 11/22; G01B 9/02004; G01B 9/02069; G01B 9/02083; Y02P 10/25; B28B 17/0081; B28B 1/001; G01N 2021/8416; G01N 21/45
USPC ............ 219/121.63, 121.45, 121.46, 121.64, 219/121.65, 121.66, 121.83; 700/118, 700/119, 166; 437/4, 2, 5, 904; 438/487, 438/96; 136/258

See application file for complete search history.

(56) References Cited

U.S. PATENT DOCUMENTS

| | | | |
|---|---|---|---|
| 8,525,072 | B2 | 9/2013 | Nakai et al. |
| 2003/0183612 | A1* | 10/2003 | Timans ............. H01L 21/67248 |
| | | | 219/390 |
| 2019/0160599 | A1* | 5/2019 | Izumi ................. B23K 26/0643 |

FOREIGN PATENT DOCUMENTS

| | | |
|---|---|---|
| JP | 2007-326134 A | 12/2007 |
| JP | 2009-142860 A | 7/2009 |
| JP | 2010-192570 A | 9/2010 |
| JP | 2011-003630 A | 1/2011 |
| JP | 2016-206085 A | 12/2016 |
| JP | 2017-022332 A | 1/2017 |
| WO | WO-2006/093264 A1 | 9/2006 |
| WO | 2015-002782 A1 | 1/2015 |

* cited by examiner

LASER POWER CONTROL DEVICE, LASER MACHINING DEVICE, AND LASER POWER CONTROL METHOD

RELATED APPLICATIONS

The contents of Japanese Patent Application No. 2018-044860, and of International Patent Application No. PCT/JP2019/009232, on the basis of each of which priority benefits are claimed in an accompanying application data sheet, are in their entirety incorporated herein by reference.

BACKGROUND

Technical Field

Certain embodiments of the present invention relate to a laser power control device, a laser machining device, and a laser power control method.

Description of Related Art

A laser annealing device that has a semiconductor wafer as a machining object and executes annealing processing by irradiating the machining object with a laser beam is known. In general, the laser annealing device includes a power meter that measures power of the laser beam on a machining surface. Then, before a start of operation of the device or each time one or a plurality of machining objects are processed, the power of the laser beam is measured by the power meter, and the power of the laser beam with which the machining surface is irradiated is adjusted by subsequent annealing processing.

The related art discloses a technique that monitors leak light of a laser beam during annealing processing in a laser annealing device and quickly detects an abnormality, such as a decrease in energy density of the laser beam.

SUMMARY

According to an embodiment of the invention, there is provided a laser power control device including: a storage unit that stores relational data having a measurement value of a heat radiation sensor, which measures intensity of heat radiation of an irradiation object irradiated with a laser beam from a laser machining device in association with a power value of the laser beam on a machining surface of the laser machining device.

According to another embodiment of the invention, there is provided a laser machining device including: an optical system that irradiates a machining object with a laser beam; a heat radiation sensor that measures heat radiation of an irradiation object irradiated with the laser beam by the optical system; and a storage unit that stores relational data having a measurement value of the heat radiation sensor in association with a power value of the laser beam on a machining surface.

According to still another embodiment of the invention, there is provided a laser power control method including: measuring heat radiation of an irradiation object irradiated with a laser beam from a laser machining device; estimating a power value of the laser beam on a machining surface of the laser machining device from a value of the measured heat radiation; and adjusting power of the laser beam on the machining surface based on the estimated power value.

DETAILED DESCRIPTION

The power meter that measures the power of the laser beam includes a light receiving surface that converts the irradiated laser beam into heat, and converts a temperature of the light receiving surface into a voltage, thereby obtaining a power value of the laser beam. In such a power meter, heat input to the light receiving surface by the irradiation of the laser beam and heat release from the light receiving surface reach an equilibrium state and a measurement value is stabilized. For this reason, there is a problem that a long time is needed until a stable measurement value is obtained. For example, a measurement time of about one minute is needed to meet measurement accuracy required for the laser annealing device. Such a long measurement time causes significant degradation of the throughput of the laser annealing device.

It is desirable to provide a laser power control device, a laser machining device, and a laser power control method capable of reducing a time needed to adjust power of a laser beam.

Hereinafter, respective embodiments of the invention will be described in detail referring to the drawings.

Figure 1:
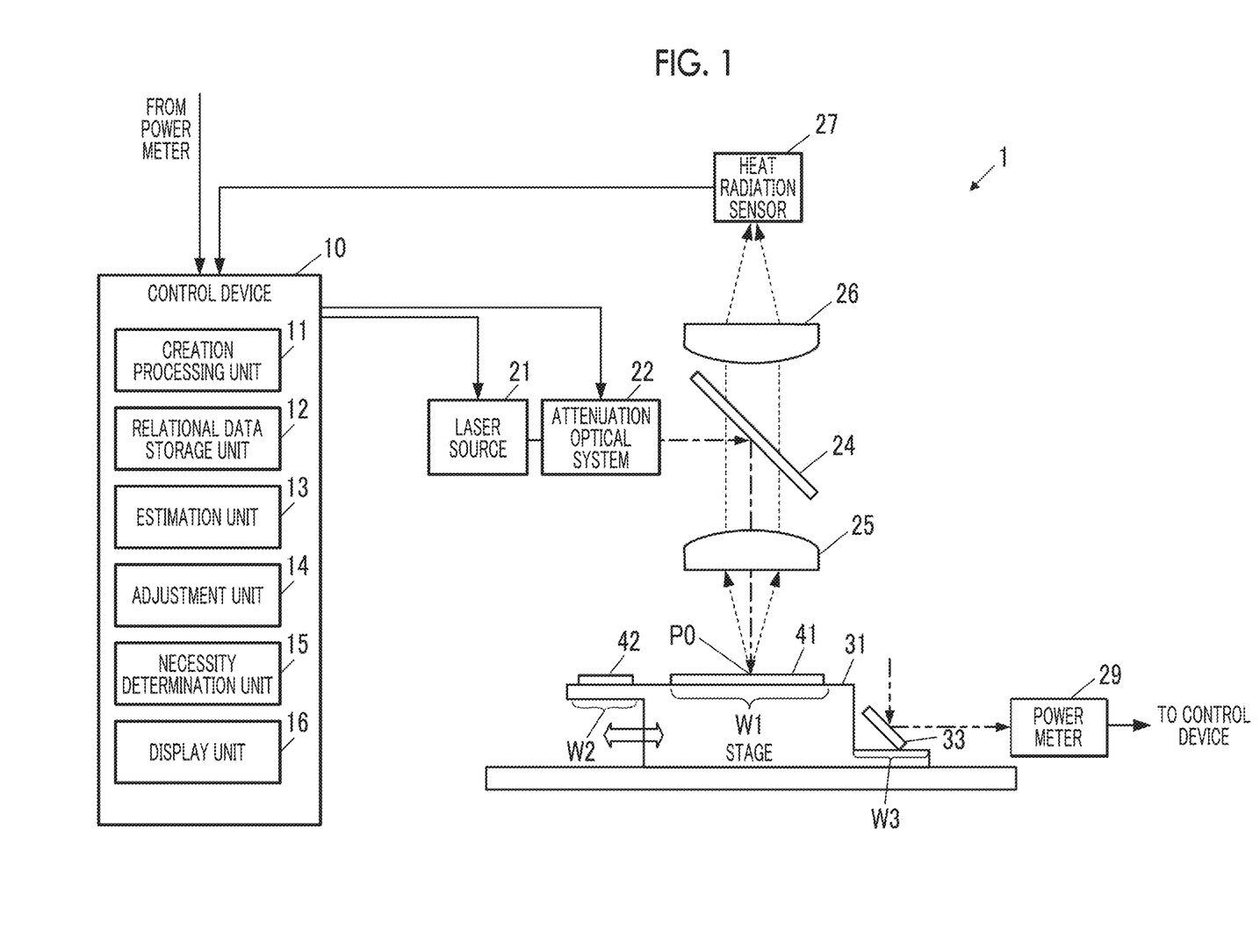
FIG. 1 is a configuration diagram showing a laser machining device according to an embodiment of the invention.

FIG. 1 is a configuration diagram showing a laser machining device according to an embodiment of the invention. In FIG. 1, optical paths of a laser beam are indicated by a one-dot chain line and a two-dot chain line, heat radiation indicated by broken lines, and signal lines are indicated by solid lines.

A laser machining device 1 according to the embodiment of the invention is a laser annealing device that has a wafer, which is a semiconductor device material, as a machining object (work) 41 and executes annealing processing by irradiating the machining object 41 with a laser beam. The laser machining device 1 includes a control device 10, a laser source 21, an attenuation optical system 22, a dichroic mirror 24, lenses 25 and 26, a heat radiation sensor 27, a power meter 29, a stage 31, a total reflection mirror 33, and an irradiation object 42. Among these, a configuration for controlling power of a laser beam of the control device 10 corresponds to an example of a laser power control device according to the invention.

The laser source 21 is, for example, a solid laser, such as a YAG laser, a gas laser, such as a $CO_2$ laser, or a semiconductor laser, such as a laser diode (LD), and outputs a laser beam, with which the machining object 41 is irradiated and the machining object 41 is heated to a high temperature. An output and a stop of the laser beam in the laser source 21 are controlled by the control device 10. The laser source 21 may be referred to as a laser oscillator.

The attenuation optical system 22 attenuates and transmits the laser beam emitted from the laser source 21. The attenuation optical system 22 can change an attenuation ratio of the laser beam, and the attenuation ratio is controlled by the control device 10.

The dichroic mirror 24 reflects light having an output wavelength of the laser source 21 and transmits light in an infrared region including heat radiation.

The lens 25 focuses the laser beam at a predetermined irradiation position P0. The lens 25 condenses heat radiation emitted from the periphery of the irradiation position P0 of the laser beam.

The lens 26 focuses the heat radiation condensed by the lens 25 and transmitted through the dichroic mirror 24 on the heat radiation sensor 27.

The heat radiation sensor 27 is, for example, an infrared sensor, and measures intensity of the heat radiation input to a light receiving portion.

The stage 31 is a table that holds the machining object 41, and is configured to be movable in two directions intersecting an optical axis of the laser beam. The stage 31 has a region W1 where the machining object 41 is held, a region W2 where the irradiation object 42 for use in estimating laser power is held, and a region W3 where the total reflection mirror 33 is mounted. The stage 31 is driven to match each of the regions W1, W2, and W3 with the irradiation position P0 of the laser beam. When the region W1 is at the irradiation position P0, an upper surface portion of the machining object 41 disposed in the region W1 becomes a machining surface. The region W1 and the region W2 are provided at the same height. In FIG. 1, an optical path of the laser beam when the total reflection mirror 33 is moved to the irradiation position P0 of the laser beam is indicated by a two-dot chain line.

The total reflection mirror 33 reflects the laser beam irradiated through the lens 25 toward the power meter 29 when the total reflection mirror 33 is moved onto extension of the irradiation position P0 of the laser beam by the drive of the stage 31.

The power meter 29 receives the laser beam and measures the power of the laser beam. The power means energy per unit time of the laser beam, and the unit of the power is, for example, joule (J)/second, watt (W), or the like. The energy may be converted to a heat quantity, and the power may be represented using the unit of the heat quantity. The power meter 29 has a light receiving surface that converts an incident laser beam into heat, and a sensor portion that converts a temperature of the light receiving surface into a voltage. While the light receiving surface is input with heat with incidence of the laser beam and increases in temperature, the light receiving surface releases heat with an increase in temperature, and in a case where the heat input and the heat release reach an equilibrium state, an output of the sensor portion is stabilized. The power meter 29 needs a time of about 60 seconds to measure the power of the laser beam with accuracy necessary for the annealing processing due to such a configuration.

The irradiation object 42 is a material that is irradiated with the laser beam to generate heat radiation in estimating the power of the laser beam from a measurement result of the heat radiation sensor 27. The irradiation object 42 may be, for example, made of the same material as the machining object 41 or may be made of a material liable to disperse heat, such as a metallic material. The irradiation object 42 is a reference work.

The control device 10 is a computer including a central processing unit (CPU), a storage device that stores a control program to be executed by the CPU and control data, and an interface for input and output of signals of the respective units. The control device 10 includes a creation processing unit 11 of relational data that creates relational data having the heat radiation in association with the power of the laser beam, a relational data storage unit 12 that stores the relational data, and an estimation unit 13 that estimates the power of the laser beam. In addition, the control device 10 includes an adjustment unit 14 that adjusts the power of the laser beam, a necessity determination unit 15 that determines a necessity for adjustment of the power, and a display unit 16 that can output an image or text. The creation processing unit 11 of the relational data, the estimation unit 13, the adjustment unit 14, and the necessity determination unit 15 are functional modules that function through execution of the control program by the CPU. The relational data storage unit 12 is an area set to store the relational data in advance in a storage area, and corresponds to an example of a storage unit according to the invention.

The relational data for use in estimating the power of the laser beam is data, such as a data table or a relational expression, indicating a correspondence relationship between a measurement value of the heat radiation sensor 27 and a measurement value of the power meter 29. The measurement value of the heat radiation sensor 27 indicated in the relational data is the measurement value of the heat radiation sensor 27 that is obtained when the irradiation object 42 is disposed at the irradiation position P0 and is irradiated with the laser beam. The measurement value of the power meter 29 associated with the measurement value of the heat radiation sensor 27 is the measurement value of the power meter 29 that is obtained when the total reflection mirror 33 is disposed on the extension of the irradiation position P0 in a state in which the power of the laser beam is the same as when the heat radiation is measured.

In a case where the irradiation object 42 is irradiated with a laser beam of high frequency pulses, after the irradiation with the laser beam, responsiveness until heat radiation according to the irradiation of the laser beam is generated is considerably high, a measurement result that a peak is repeated at a frequency according to the pulse of the laser beam is obtained from the heat radiation sensor 27. In a case where the same point is not continuously irradiated with the laser beam for a long time, the power of the laser beam and a peak value of the heat radiation of the irradiation object 42 have a substantially constant relationship. For example, the peak value of the heat radiation immediately after a place at a room temperature of the irradiation object 42 is irradiated with the laser beam of a predetermined number of pulses (for example, 10 pulses) becomes a value reflecting the power of the laser beam with excellent accuracy. The value obtained in this way is used as the measurement value of the heat radiation sensor 27 of the relational data.

In regard to the measurement value of the power meter 29, as described above, along time of about 60 seconds is needed until a stable value is obtained. The measurement value of the power indicated in the relational data corresponds to the stable measurement value obtained from the power meter 29 over a long time in this way.

The creation processing unit 11 of the relational data executes relational data creation processing described below to create the above-described relational data.

The relational data storage unit 12 stores the relational data created by the creation processing unit 11. Alternatively, the relational data storage unit 12 may store the relational data created by another device or the like in advance.

The estimation unit 13 estimates the power of the laser beam at the irradiation position P0 from the intensity of the heat radiation of the irradiation object 42 irradiated with the laser beam and the relational data stored in the relational data storage unit 12.

The adjustment unit 14 performs control such that the attenuation optical system 22 adjusts the power of the laser beam at the irradiation position P0 based on the power of the laser beam estimated by the estimation unit 13 before the start of operation of the laser machining device or in an adjustment process that is carried out when fluctuation of a given amount or more occurs in the power of the laser beam.

The necessity determination unit 15 executes necessity determination processing described below and determines a timing at which readjustment of the power of the laser beam is required during the operation of the laser machining device 1. The power of the laser beam at the irradiation position P0 slightly fluctuates due to a temperature drift or the like of each unit during the operation of the laser machining device 1. In a device of the related art, in order to cope with such fluctuation of the power, each time the number of times of the annealing processing becomes a predetermined number of times, readjustment of the power of the laser beam has been carried out. However, in this method, an interval of the readjustment has been decided such that yield is not degraded and the power is readjusted when fluctuation of the power is sufficiently small. With this, a frequency of the readjustment has increased, resulting in degradation of the efficiency of the annealing processing. The necessity determination unit 15 determines a necessity for the readjustment of the power such that a frequency of the readjustment of the power does not increase while fluctuation of the power of the laser beam is suppressed within a range in which yield is not degraded.

Figure 5:
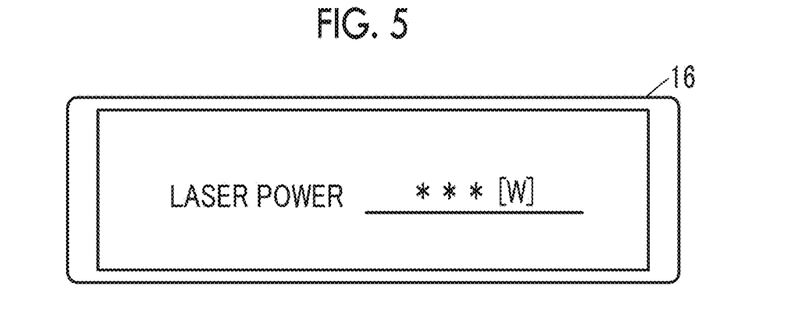
FIG. 5 is a diagram showing a display example of a display unit of FIG. 1.

The display unit 16 displays a power value of the laser beam estimated by the estimation unit 13, a power value of the laser beam adjusted during the adjustment processing, and the like (see FIG. 5).

Relational Data Creation Processing

Figure 2:
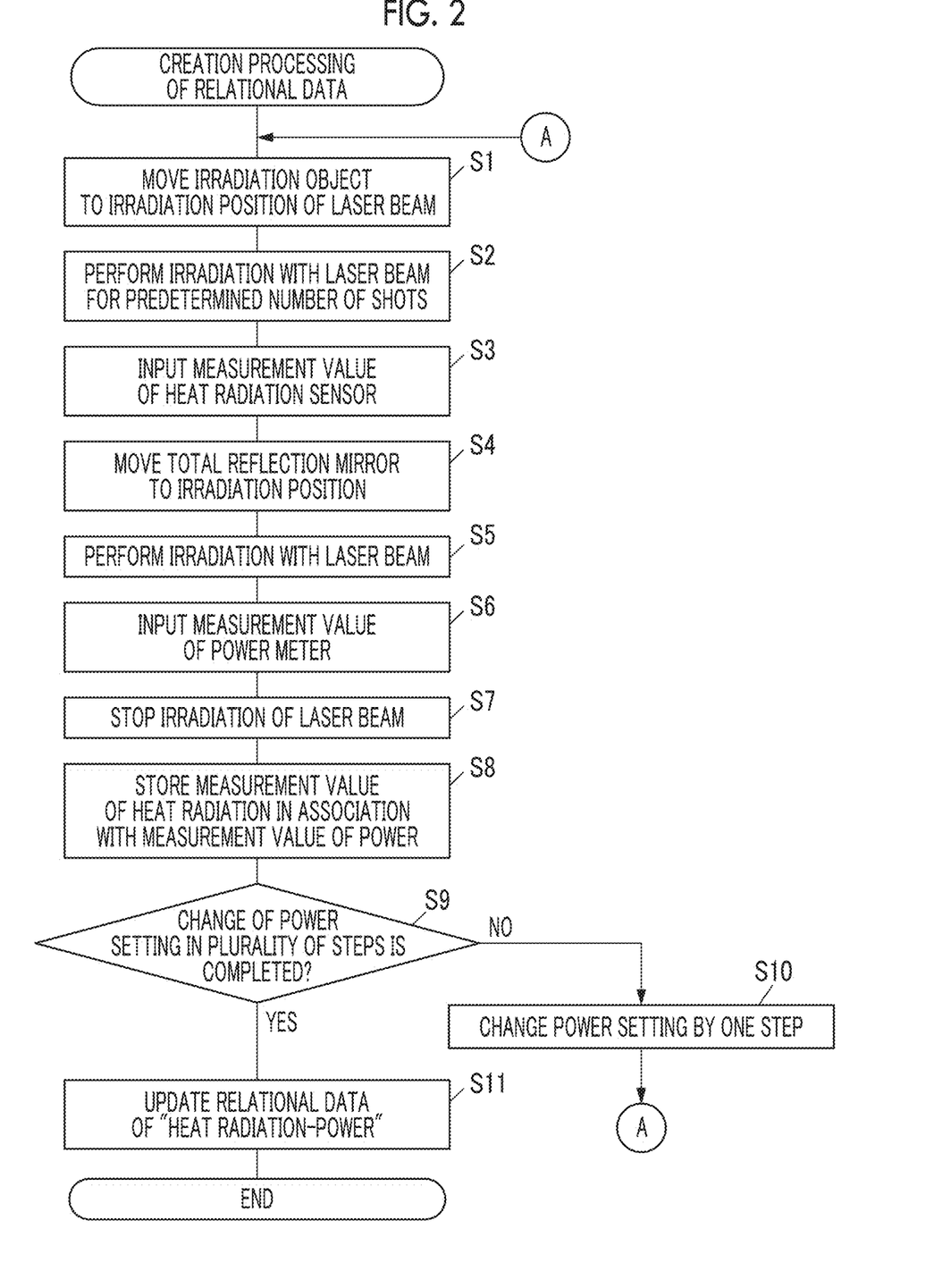
FIG. 2 is a flowchart showing creation processing of relational data to be executed by a creation processing unit.

Next, creation processing of the relational data for use in estimating the power of the laser beam will be described. FIG. 2 is a flowchart showing creation processing of relational data to be executed by the creation processing unit.

The creation processing of the relational data is executed by the creation processing unit 11 according to an instruction of an operator or automatically at the time of an initial setting of the laser machining device 1 or when the irradiation object 42 is replaced due to deterioration or the like.

In a case where the creation processing of the relational data is started, the creation processing unit 11 drives the stage 31 to move the irradiation object 42 to the irradiation position P0 of the laser beam (Step S1). Next, the creation processing unit 11 irradiates an irradiation position P0 with the laser beam for a predetermined number of shots (Step S2), and receives as input the measurement value of the heat radiation sensor 27 (Step S3). Here, the creation processing unit 11 may employ an average value of peak values of heat radiation measurement values corresponding to the irradiation of the laser beam for the predetermined number of shots as the measurement value of the heat radiation. The irradiation of the laser beam may be carried by switching the on and off of the operation of the laser source 21 or may be carried out by switching between transmission and shutoff of the laser beam emitted from the laser source 21 using an optical element.

Subsequently, the creation processing unit 11 drives the stage 31 to move the total reflection mirror 33 on the extension of the irradiation position P0 of the laser beam (Step S4). Then, the creation processing unit 11 irradiates the irradiation position P0 with the laser beam (Step S5), receives as input the measurement value of the power meter 29 (Step S6), and in a case where the stable measurement value is obtained, stops the irradiation of the laser beam (Step S7). Then, the creation processing unit 11 stores the measurement value of Step S3 in association with the measurement value of Step S6 (Step S8).

Next, the creation processing unit 11 determines whether or not a power setting of the laser beam is changed in predetermined multiple steps (Step S9), and in a case where the power setting of the layer beam is not yet changed, performs control such that the attenuation optical system 22 changes the power setting by one step (Step S10). Then, the process is returned to Step S1, and the processing of Steps S1 to S8 is repeated. Loop processing of Steps S1 to S10 is repeated, whereby data of a combination of the measurement value of the heat radiation and the measurement value of the power of the laser beam corresponding to the measurement value of the heat radiation is obtained in each of a plurality of power settings.

Then, in a case where determination is made in Step S9 that the change of the power setting is completed, the relational data having the measurement value of the heat radiation in association with the power value of the laser beam is updated using data stored in Step S8 and is stored in the relational data storage unit 12 (Step S11). Then, the relational data creation processing ends.

With the relational data creation processing described above, it is possible to automatically create the relational data having the measurement value of the heat radiation in association with the measurement value of the power meter 29. The relational data may be created by executing the same processing as in FIG. 2 through a human operation.

Adjustment Processing

Figure 3:
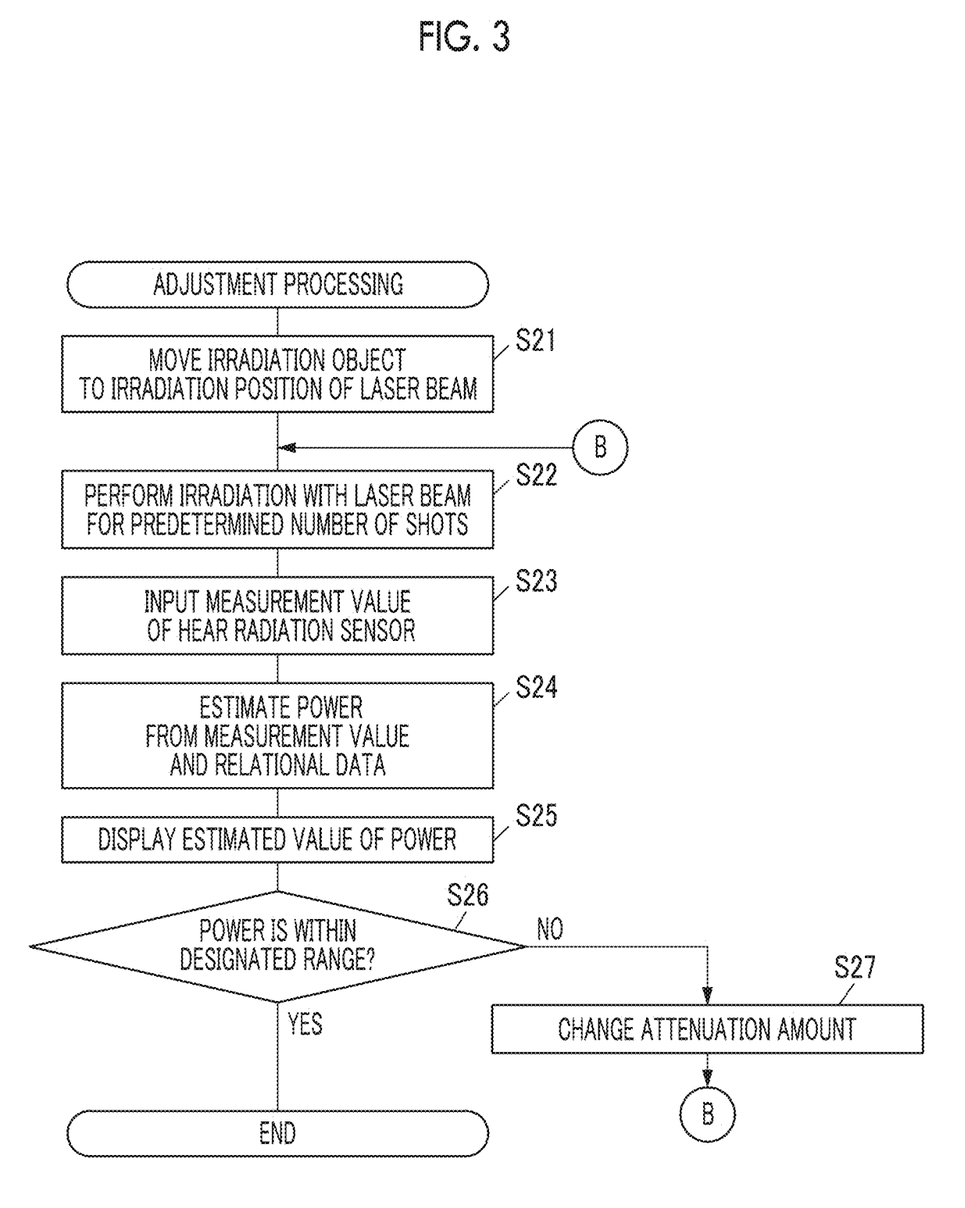
FIG. 3 is a flowchart showing adjustment processing of power of a laser beam to be executed by a control device.

Next, adjustment processing of adjusting the power of the laser beam will be described. FIG. 3 is a flowchart showing the adjustment processing of the power of the laser beam that is executed by the control device. The adjustment processing corresponds to an example of a control method of laser power according to the invention.

The adjustment processing of the power of the laser beam is executed in a subsequent adjustment process before the start of operation of the laser machining device 1, in a case where the power of the laser beam fluctuates by a predetermined amount during the operation, or in a case where there is an instruction of the operator.

In a case where the adjustment processing is started, the control device 10 drives the stage 31 to move the irradiation object 42 to the irradiation position P0 (Step S21). Next, the control device 10 irradiates the irradiation position P0 with the laser beam for a predetermined number of shots (Step S22), and receives as input the measurement value of the heat radiation sensor 27 (Step S23). Here, the control device 10 may employ an average value of peak values of heat radiation measurement values corresponding to the irradiation of the laser beam for the predetermined number of shots as the measurement value of the heat radiation.

Next, the estimation unit 13 of the control device 10 estimates the power of the laser beam at the irradiation position P0 based on the relational data stored in the relational data storage unit 12 and the measurement value of the heat radiation acquired in Step S23 (Step S24). Here, since the relational data has the measurement value of the heat radiation in association with the measurement value of the power of the laser beam corresponding to the measurement value of the heat radiation, the estimation unit 13 estimates the power of the laser beam in compliance with the correspondence relationship.

In a case where the power of the laser beam is estimated, the control device 10 displays an estimated value of the power on the display unit 16 (see Step S25 and FIG. 5). The estimated value of the power displayed in the middle of Steps S22 to S26 repeatedly executed corresponds to an adjusted value representing the power of the laser beam after adjustment. Subsequently, the adjustment unit 14 of the control device 10 determines whether or not the power is within a designated range (Step S26), and in a case where the power is outside the range, the adjustment unit 14 performs control such that the attenuation optical system 22 adjusts the power so as to fall within the range (Step S27). Then, the control device 10 returns the process to Step S22 and executes Steps S22 to S26 again. Here, the designated range of the power corresponds to the power of the laser beam with which the machining object 41 should be irradiated in the laser annealing processing.

On the other hand, in a case where determination is made in Step S26 that the power is within the designated range, the control device 10 ends the adjustment processing. With such adjustment processing, it is possible to adjust the power of the laser beam to be within the designated range quickly and with high accuracy.

In the embodiment, an example where the functional modules in the device execute the estimation of the power of the laser beam (Step S24) to the processing of performing control such that the attenuation optical system 22 adjusts the power of the laser beam (Step S27) has been described. However, a part or all of the processing may be executed manually by a person. For example, the display unit 16 may be made to output the measurement value of the heat radiation, a person may estimate the power with reference to the output value and the relational data, and the person may adjust an attenuation amount of the attenuation optical system 22 through a knob operation, thereby performing an operation such that the power falls within the designated range.

In the embodiment, the processing of adjusting the power of the laser beam based on the measurement value of the heat radiation when the irradiation object 42 is irradiated with the laser beam has been described. However, in a case where the irradiation object 42 and the machining object 41 are made of a material of the same quality, the machining object 41 may be used as the irradiation object 42, apart of the machining object 41 may be irradiated with the laser beam, and the power of the laser beam may be estimated and adjusted using the measurement value of the heat radiation at that time.

Machining Processing

A machining process is a process of executing machining processing (annealing processing) on the machining object 41, and is transitioned in a state in which the power of the laser beam, with which the irradiation position P0 is irradiated, is adjusted. In the machining process, the control device 10 drives the stage or drives an optical system to change relative positions of the irradiation position P0 and the machining object 41 such that the irradiation position P0 traces each place of a region to be processed of the machining object 41. In addition, the control device 10 applies heat treatment to the machining object 41 by irradiating the irradiation position P0 with the laser beam while moving the irradiation position P0. In a case where the heat treatment is completed on the entire region to be processed of one machining object 41, the machining processing on one machining object 41 is completed.

Necessity Determination Processing for Power Adjustment

Figure 4:
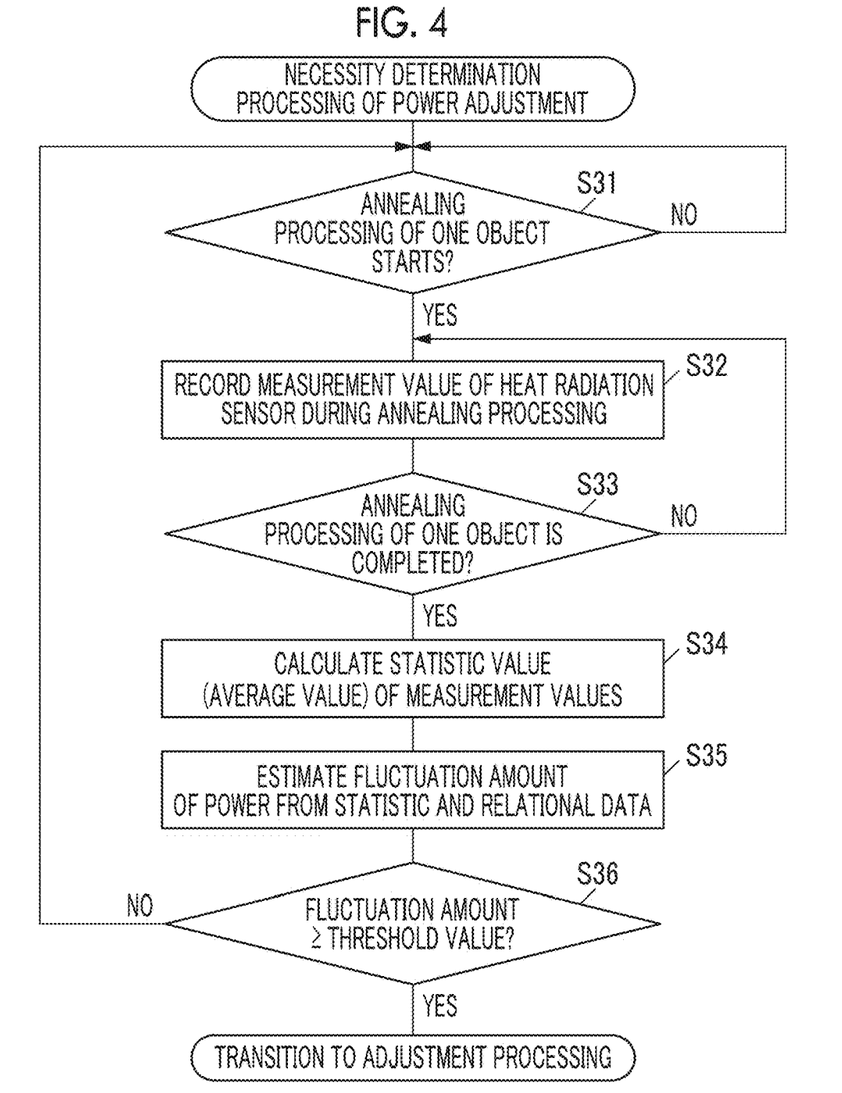
FIG. 4 is a flowchart showing necessity determination processing of power adjustment that is executed by a necessity determination unit.

Subsequently, a necessity determination processing for power adjustment of the laser beam will be described. FIG. 4 is a flowchart showing the necessity determination processing for power adjustment to be executed by the necessity determination unit.

The necessity determination processing is executed by the necessity determination unit 15 when the annealing processing is sequentially executed on a plurality of machining objects 41 during the operation of the laser machining device 1. In a case where the necessity determination processing is started, the necessity determination unit 15 determines whether or not the annealing processing of one machining object 41 is started (Step S31), and in a case where the annealing processing is started, progresses the process a next step. Then, the necessity determination unit 15 receives as input and records the measurement value of the heat radiation sensor 27 during the irradiation of the machining object 41 with the laser beam (Step S32), and determines whether or not the annealing processing of one machining object 41 is completed (Step S33). Then, until the annealing processing is completed, receiving as input and recording of the measurement value are repeated. With this, each measurement value of the heat radiation when each place of the region to be processed of the machining object 41 is irradiated with the laser beam is accumulated.

In a case where the annealing processing of one machining object 41 is completed, the necessity determination unit 15 calculates a statistic indicating average heat radiation for a plurality of measurement values of the heat radiation recorded during the annealing processing (Step S34). The statistic may be simply an average of a plurality of measurement values or may be an average value of a range excluding the measurement values of the heat radiation in a periphery of an annealing region. Alternatively, the necessity determination unit 15 may calculate a variance value of the heat radiation as the statistic.

Next, the necessity determination unit 15 estimates a fluctuation amount of the power of the laser beam from the statistic calculated in Step S34 and the relational data stored in the relational data storage unit 12 (Step S35). Since a measurement condition in obtaining the measurement value of the heat radiation in the relational data is different from when the annealing processing is executed on the machining object 41, it is not possible to accurately acquire the power of the laser beam from the value of the heat radiation during the annealing processing using the relational data. Meanwhile, it is possible to obtain a ratio of a change amount of the heat radiation to a change amount of the power of the laser beam from the relational data, and the ratio and a ratio of a change amount of the heat radiation to a change amount of the power during the annealing processing have a correlative relationship. The correlative relationship is given to the necessity determination unit 15 in advance, and the necessity determination unit 15 can calculate a ratio of a change amount of the power of the laser beam to a change amount of the value of the heat radiation for single annealing processing from the correlative relationship and the ratio obtained from the relational data. In Step S35, the necessity determination unit 15 calculates the change amount of the heat radiation for single annealing processing from the statistic calculated in previous Step S34 and multiplies the change amount of the heat radiation by the ratio calculated from the correlative relationship and the relational data to estimate the fluctuation amount of the power of the laser beam.

In a case where the fluctuation amount of the power of the laser beam is estimated, the necessity determination unit 15 determines whether or not the fluctuation amount exceeds a threshold (Step S36), and in a case where the fluctuation amount does not exceed the threshold, returns the process to Step S31 and continues the necessity determination processing. On the other hand, in a case where the fluctuation amount exceeds the threshold, the process transitions to the adjustment processing of readjusting the power of the laser beam before next annealing processing. The threshold is set to a value at which the yield of the annealing processing is not degraded and the frequency of the readjustment of the power can be suppressed low.

With such necessity determination processing, the readjustment is executed only when the adjustment of the power of the laser beam is required, and with this, it is possible to realize more efficient annealing processing of the machining object 41.

In the above-described necessity determination processing, an example where the fluctuation amount of the power of the laser beam is estimated using the relational data and the measurement value of the heat radiation and the necessity for the readjustment of the power is determined has been described. Meanwhile, the value of the heat radiation of the machining object 41 during the machining processing and the power value of the laser beam have a correlative relationship. Accordingly, the necessity determination unit 15 may determine the necessity for the readjustment of the power by comparing the statistic of the measurement values of the heat radiation during the machining processing with the threshold without using the relational data. Alternatively, the necessity determination unit may determine the necessity for the readjustment of the power based on a fluctuation amount of the statistic from the last processing or the processing before the last processing in a process of the machining processing of a plurality of machining objects 41.

As described above, with the laser machining device 1 and the laser power control device of the embodiment, the relational data having the measurement value of the heat radiation at the time of the irradiation of the irradiation object 42 with the laser beam in association with the power of the laser beam at the irradiation position P0 measured by the power meter 29 is stored. Accordingly, it is possible to estimate the power of the laser beam at the irradiation position P0 from the relational data and the measurement value of the heat radiation. Then, with the use of the estimation result of the power of the laser beam, it is possible to accurately estimate the power of the laser beam based on the measurement of the heat radiation without needing time and to adjust the power of the laser beam without performing the measurement of the power every time over a long time using the power meter 29. With this, it is possible to achieve improvement of the throughput of the machining processing. In the embodiment, the person may manually perform the estimation of the power of the laser beam and the adjustment of the power.

With the laser machining device 1 and the laser power control device of the embodiment, the estimation unit 13 that estimates the power of the laser beam from the measurement value of the heat radiation and the relational data is provided. Accordingly, the estimation of the power of the laser beam can be performed inside the device using the estimation unit 13, and it is possible to omit a complicated work of the person and to obtain an estimation result with few mistakes compared to a case where the person manually performs the estimation of the power of the laser beam.

With the laser machining device 1 of the laser power control device of the embodiment, the adjustment unit 14 that adjusts the power of the laser beam at the irradiation position P0 based on the estimation result of the power is provided. Accordingly, it is possible to perform the adjustment of the power of the laser beam inside the device using the adjustment unit 14, and compared to a case where the person manually performs the adjustment of the power of the laser beam, it is possible to omit a complicated work of the person and to perform accurate and quick adjustment of the power.

With the laser machining device 1 and the laser power control device of the embodiment, the necessity determination unit 15 that determines the necessity for the adjustment of the power of the laser beam at the irradiation position P0 based on the relational data and the measurement result of the heat radiation during the machining processing is provided. Accordingly, while the machining processing of a plurality of machining objects 41 is being continued, it is possible to appropriately decide a timing of performing the readjustment of the power next according to the determination of the necessity determination unit 15. For example, it is possible to decide an appropriate timing of performing the readjustment of the power such that the frequency of the readjustment of the power does not increase while fluctuation of the power of the laser beam is suppressed within a range in which the yield of the laser machining device 1 is not degraded. With this, it is possible to improve the throughput of the machining processing of the laser machining device.

The embodiment of the invention has been described above. However, the invention is not limited to the above-described embodiment. For example, in the above-described embodiment, although an example where the power meter is provided in the laser machining device has been described, as the laser machining device, a configuration in which the relational data having the measurement value of the heat radiation in association with the power value of the laser beam is given from the outside of the device, and the power meter is not provided may be employed. In the above-described embodiment, although a case where the laser machining device is the laser annealing device has been described, as the laser machining device, a laser drilling device that provides a through-hole or a non-through-hole in a wiring board with a laser beam, a laser welding device that performs welding with a laser beam, or the like may be applied. In addition, various optical systems having various functions may be added in an optical path from the laser source to the machining object, and the details described in the embodiment can be suitably changed without departing from the spirit and scope of the invention.

The invention is usable for a laser power control device, a laser machining device, and a laser power control method.

It should be understood that the invention is not limited to the above-described embodiment, but may be modified into various forms on the basis of the spirit of the invention. Additionally, the modifications are included in the scope of the invention.

What is claimed is:

1. A laser machining device comprising:
   a laser source configured to emit a laser beam;
   an optical attenuator configured to irradiate, with the laser beam emitted from the laser source, a machining object or an irradiation object;
   a heat radiation sensor configured to measure heat radiation of the irradiation object or the machining object irradiated with the laser beam by the optical attenuator;
   a power meter configured to measure power of the laser beam on the irradiation object irradiated with the laser beam by the optical attenuator; and
   a laser power control device that comprises a processor and a storage, wherein the processor is configured to:
  create relational data having a measurement value of the heat radiation of the irradiation object from the heat radiation sensor in association with a power value of the laser beam on the irradiation object from the power meter,
  estimate power of the laser beam on the machining object based on a measurement value of the heat radiation sensor and the relational data stored in the storage, and
  adjust power of the laser beam irradiated on the machining object based on an estimation result, and
wherein the storage is configured to store the relational data.

2. A laser power control method comprising:
measuring, by a heat radiation sensor, heat radiation of an irradiation object irradiated with a laser beam from a laser machining device;
measuring, by a power meter, power of the irradiation object irradiated with the laser beam from the laser machining device;
creating relational data having a measurement value of the heat radiation of the irradiation object from the heat radiation sensor in association with a power value of the laser beam on the irradiation object from the power meter,
storing the relational data in a storage,
measuring, by the heat radiation sensor, heat radiation of a machining object irradiated with the laser beam on the laser machining device;
estimating, by a processor, a power value of the laser beam on the machining object based on the heat radiation measured from the machining object by the heat radiation sensor and the relation data stored in the storage; and
adjusting, by the processor based on the estimated power value, power of the laser beam on the machining object.

3. The laser machining device according to claim 1, wherein the laser power control device further includes a display configured to display the power of the laser beam estimated by the processor or the power of the laser beam adjusted by the processor.

4. The laser machining device according to claim 1, wherein the processor is configured to determine a necessity for adjustment of power of the laser beam based on the measurement value of the heat radiation sensor obtained during irradiation with the laser beam of the machining object and the relational data.

* * * * *